United States Patent [19]

Thayer

[11] Patent Number: 5,278,949
[45] Date of Patent: Jan. 11, 1994

[54] POLYGON RENDERER WHICH DETERMINES THE COORDINATES OF POLYGON EDGES TO SUB-PIXEL RESOLUTION IN THE X,Y AND Z COORDINATES DIRECTIONS

[75] Inventor: Larry J. Thayer, Fort Collins, Colo.

[73] Assignee: Hewlett-Packard Company, Palo Alto, Calif.

[21] Appl. No.: 669,150

[22] Filed: Mar. 12, 1991

[51] Int. Cl.⁵ .................................... G06F 15/62
[52] U.S. Cl. ................................ 395/126; 395/119; 395/120; 395/132
[58] Field of Search ...... 395/119-122; 125, 127, 132, 133, 137-138, 162-166

[56] References Cited

U.S. PATENT DOCUMENTS

| | | | |
|---|---|---|---|
| 4,737,921 | 4/1988 | Goldwasser et al. | 395/163 X |
| 4,837,447 | 6/1989 | Pierce et al. | 395/164 X |
| 4,910,683 | 3/1990 | Bishop et al. | 395/137 X |
| 4,945,500 | 7/1990 | Deering | 395/122 |
| 5,025,405 | 6/1991 | Swanson | 395/132 X |

OTHER PUBLICATIONS

Paul Haeberli and Kurt Akeley, *The Accumulation Buffer: Hardware Support for High-Quality Rendering*, Computer Graphics, vol. 24 No. 4, Aug. 1990, pp. 309-313.

R. W. Swanson and L. J. Thayer, "A Fast Shaded-Polygon Renderer", *Proceedings of Siggraph '86*, Computer Graphics, vol. 20, No. 4 (Aug. 1986), pp. 95-101.

K. Akeley and T. Jermoluk, "High-Performance Polygon Rendering", *Computer Graphics*, vol. 22, No. 4, Aug. 1988.

*Primary Examiner*—Gary V. Harkcom
*Assistant Examiner*—Almis Jankus
*Attorney, Agent, or Firm*—Guy J. Kelley

[57] ABSTRACT

A polygon rendering circuit for a computer color graphics system comprising an edge stepper which steps along edges of an input polygon to determine the span of the polygon along each scan line intersected by the polygon. The coordinate values of the edges on each scan line are determined to sub-pixel resolution such that only those pixels whose centers lie within the true polygon edges (within the span width) must be drawn. Processing efficiency is improved and bandwidth is minimized by passing only those edges of the polygon which are new to that polygon and by computing the Z values in the same manner as, and in parallel with, the X values. Improved results are also possible in accordance with the technique of the invention, for since adjacent polygons compute the same edge by stepping, there can be no gaps between polygons due to round-off errors.

10 Claims, 4 Drawing Sheets

POLYGON RENDERER WHICH DETERMINES THE COORDINATES OF POLYGON EDGES TO SUB-PIXEL RESOLUTION IN THE X,Y AND Z COORDINATES DIRECTIONS

CROSS-REFERENCE TO RELATED APPLICATIONS

The present invention is related to U.S. patent application Ser. Nos. 07/493,185, filed Mar. 14, 1990 and entitled "Accelerated Decomposition of Small Polygons into Trapezoids" (now U.S. Pat. No. 5,133,049);, 07/494,292, Mar. 16, 1990 and entitled "Decomposition of Arbitrary Polygons Into Trapezoids" (now U.S. Pat. No. 5,129,051); and 07/493,189, filed Mar. 14, 1990 and entitled "Perspective Interpolation Algorithm", all of which are assigned to the same Assignee as this application and hereby incorporated by reference in their entireties as if fully set forth herein.

BACKGROUND OF THE INVENTION

1. Field of the Invention

The present invention relates to polygon rendering circuitry of a computer graphics system, and more particularly, to a circuit for determining, to sub-pixel resolution, the coordinates of points along respective edges of a polygon on each scan line covered by the polygon and for filling in the display pixels within the polygon for display.

2. Description of the Prior Art

Prior art raster graphics systems generally contain two distinct parts: a graphics transformation engine that transforms and lights the geometric description of a scene in accordance with the user's viewpoint and a renderer that paints the transformed scene onto a display screen. As is well known, the geometric description of the scene may comprise a combination of a plurality of polygons having an arbitrary number of sides. In other words, the 3-dimensional image to be displayed has been described as a surface composed of polygons of differing shadings. As used herein such a "polygon" refers to an ordered set of vertices $V[1] \ldots V[N]$ where N is the vertex count for the polygon. These vertices specify the N edges of the polygon, which are line segments $E[1] \ldots E[N]$ with end points made up of respective vertices $V[1] \ldots V[N]$. For example, line segment $E[1]$ may have end points $V[1]$ and $V[2]$, while line segment $E[2]$ has end points $V[2]$ and $V[3]$. Such polygons may be identified by the graphics transformation engine as a sequence of graphics primitives including information such as the coordinates (X,Y,Z) of the vertices of each polygon as well as the shading information for each of the vertices and instructions which are processed in the graphics transformation engine for all pixel-level rendering computations.

Such geometric representations of a scene greatly facilitate the processing by a graphics transformation engine which is necessary for rendering the pixel image data to the display screen. The graphics transformation engines typically perform many tasks on such data including graphics context management, matrix transformation calculations, spline tessellation and lighting model computations. The transformation engines may also control vector and polygon rendering hardware. However, such computations are generally quite complex and time-consuming and require much processing power. The resulting processing difficulties significantly limit the speed by which images may be rendered in conventional raster graphics systems.

Despite such problems, workstation users are demanding ever-increasing performance and image quality from graphics workstations. This demand produces a corresponding appetite for computing power. One of the most compute-intensive functions of a graphics workstation, besides processing by the graphics transformation engine, is the process of scan conversion, where vector and polygon end points are transformed into pixels on a raster scan display and the pixels appropriately shaded. During the 1980's, a number of 3-D workstations were introduced with hardware scan converters that performed smooth color shading, but all such workstations provided fairly low performance and/or limited feature sets. As a result, designers of such systems often compromised by approximating the correct colors for each pixel by linearly interpolating the colors across each polygon face without correctly accounting for the effect of perspective and by using a simplified polygon sampling method. However, such compromises have been found to cause problems when used in conjunction with advanced features of the type desired for modern day graphics workstations.

Graphics workstations of the 1990's require scan converters which make no such compromises. The increasing complexity of user images requires scan converters capable of generating color, Z (depth), and texture map parameter values in perspective for each pixel in every vector and polygon at a sustained 50M pixels/second (or greater) rate, with peak rates approaching at least 100M pixels/second. Until recently, this level of performance was out of reach due to the complexity of the perspective interpolation algorithms. Indeed, the complexity of perspective-corrected interpolation and texture mapping precluded their hardware implementation, and typically, the correct shading was approximated by implementing linear interpolation of color and Z. However, due to advances in graphics workstation hardware, perspective interpolation and texture mapping are now possible without sacrificing the 100M pixels/second peak rate. For example, a high speed perspective interpolation system is described in U.S. patent application Ser. No. 07/493,189, which was incorporated above by reference, while a high speed texture mapping system is described in U.S. patent application Ser. No. 07/494,706, filed Mar. 16, 1990 and entitled "Method and Apparatus for Generating Textured Graphics Primitives in Frame Buffer Computer Graphics Systems."

Different techniques exist for determining which pixels inside a polygon will be rendered to the display screen by the rendering circuitry. For example, the incrementing fractions interpolation technique permits calculation of the x axis value along the scan line without solving the $X = M*Y + C$ (which requires a multiplication) for each value of Y in the direction perpendicular to the scan line. This is accomplished by computing the line differential, slope M, as a constant equal to $(X_{end} - X_s)/(Y_{end} - Y_s)$. Once M has been computed, successive X,Y points can be generated by repeatedly incrementing Y by 1 and adding M to X. All X values are rounded to the nearest integer by adding 0.5 to the initial X value and truncating each X result. However, such a division is generally slow and is prone to round-off errors. Moreover, the fractional part of M and X must have a precision at least equal to the screen precision to be guaranteed of hitting the correct end point.

These problems were earlier solved by the present inventor by extending the Bresenham algorithm to polygon rendering.

In particular, the present inventor described in an article entitled "A Fast Shaded-Polygon Renderer", *Proceedings of SIGGRAPH '86, Computer Graphics*, Vol. 20, No. 4 (August 1986), pp. 95–101, a one-chip VLSI implementation of a shaded-polygon renderer. The polygon renderer described therein takes advantage of an extension to Bresenham's vector drawing algorithm to interpolate four axes (for red, green, blue and Z) across a polygon in addition to the X and Y values. Such a method has provided rendering speeds suitable for interactive manipulation of solids.

As noted above, for most methods of image synthesis, the image is generated by breaking the surfaces of the object into polygons. The color and intensity at each vertex may then be calculated and the results drawn into a frame buffer while interpolating the colors across the polygon. This is known as Gouraud shading. The color information can be calculated from light source data or computed with thermal or stress analysis. The interpolation of coordinate and color (or intensity) across each polygon, on the other hand, is accomplished by interpolating the coordinate and color of each quantized point (pixel) on the edges of the polygon and subsequently interpolating from edge to edge to generate the fill lines. If hidden surface removal with a Z buffer is required, then the depth (Z) value for each pixel must also be calculated. Also, since color components can vary independently across a surface or set of surfaces, red, green, and blue intensities must be interpolated independently. Thus, for a general purpose graphics system, a minimum of 6 different parameters (X, Y, Z, Red, Green, and Blue) must be independently calculated when drawing polygons with Gouraud shading and interpolated Z values. In the aforementioned article, the present inventor teaches extending the line-drawing algorithm proposed by Bresenham to six axes so that the values of X, Y, Z, Red, Green, and Blue may be determined for polygon rendering.

The polygon renderer of that system begins the polygon fill process by reading an instruction and a pointer out of an external dual-ported RAM. The instruction indicates what kind of figure (polygon or vector) is to be drawn and if a line type pattern is to be used. The pointer indicates the location of the first edge data packet for the polygon, and each packet contains a pointer to the next packet. The first pointer is passed to an EDGE functional block. The EDGE block builds up an ordered list of active edges (in the order to be used) and then reads the data packets of the first two edges to be drawn. As they are read, they are passed to a SETUP block and then on to the interpolator. When the interpolator finishes one scan line of each edge, the packets are passed back to the EDGE block. The EDGE block dynamically maintains an active edge list, adding edges as the current scan line reaches them and deleting edges as they are completed. The EDGE block also re-sorts the order of the active edge list whenever two edges cross. This permits the drawing of non-planar, concave, twisted polygons which may contain holes.

As the interpolator steps along each edge in such a polygon rendering system, the output is sampled by a FILL block. The FILL block saves the starting and ending points of each edge's contribution to the scan line. From these values, it generates fill vectors which are passed on to a SETUP block. The FILL block also keeps track of whether or not each edge is just starting or ending so as to properly handle vertices. This polygon fill process will now be described with respect to FIG. 1.

FIG. 1 illustrates a polygon to be rendered and the first four lines of pixels drawn. The pixels in the edge are represented with circles and the pixels making up the fill lines are shown as squares. In this example, once the setup for Edge 1 is complete, its packet of data is sent to the interpolator and the first row of pixels in the edge is drawn. Then the packet is sent to the EDGE block which compares its X and Y values to verify that the third edge does not yet have to be activated. After Edge 2 is set up, its first pixel is drawn and its packet is sent on to the EDGE block. Then, the next horizontal row of pixels in Edge 1 is drawn, followed by the next pixel in Edge 2. As shown, for the second and each subsequent fill line, Edge 1 has several pixels drawn per line, while Edge 2 has only one. The fill line (Fill 1) is then drawn between the inside pixels of each edge. While Fill 1 is being set up, the two edges are again incremented in the Y direction and the next row of pixels in the edges is drawn. The process is repeated for each scan line in the polygon.

Excellent results have been achieved with the above-mentioned polygon rendering system. However, since multiple steps sometimes must be used for generating the edge at each scan line, the edge forming process has been found to take a substantial portion of the polygon fill time. Moreover, since the extended Bresenham algorithm renders polygon edges by drawing pixels which lie closest to the true edges, adjacent polygons may overlap or underlap, whereby pixels from backfacing polygons can be seen through gaps between adjacent polygons due to round-off errors. It is desired to minimize this processing time for the edges. It is also desired to precisely identify the edge for each scan line using a very precise point sampling algorithm such that there need only be one pixel for each edge and all pixels therebetween are fill pixels which may be readily interpolated in an efficient manner by the interpolator. In other words, an improved technique for identifying the edges of polygons is desired so that only pixels actually within the polygon edges will be drawn, problems with overlap and underlap will be avoided, and less processing time will be necessary for forming the edges during the polygon rendering process.

Akeley et al. describe in an article entitled "High-Performance Polygon Rendering", *Computer Graphics*, Vol. 22, No. 4, August 1988, a polygon rendering system architecture for real-time display of shaded polygons. Akeley et al. compute the Y coordinates of the polygon edges to $\frac{1}{8}$ pixel tolerance and then correct all depth and color component iterations to the nearest pixel center, which are then iterated in full-pixel steps. Akeley et al. use an Edge Processor to iterate along the top and bottom edges of the trapezoid so as to generate at each iteration the top and bottom coordinates of a single span. Color and depth values are computed using changes in Y to $\frac{1}{8}$ pixel accuracy. The slope is then used to iterate to the nearest pixel center. Accordingly, the final span definition comprises the corrected initial color and depth values, the color and depth slopes, the integer X and Y value of the bottom pixel, and the span length.

FIG. 2 shows a polygon ABCD which is rendered in accordance with the technique of Akeley et al. As shown, the polygon ABCD is broken into trapezoids, and the interstitial points X' and X" are determined. The polygon is then filled by using the slope of the edges to iterate with to the nearest pixel center from the edge intersection with the next line. Thus as with the extended Bresenham algorithm, the nearest pixel center is identified as part of the polygon, irrespective of whether that pixel is inside or outside of the polygon being drawn.

The system of Akeley et al. also provides very fast polygon fill rates. However, the system of Akeley et al. requires the determination of the interstitial points X' and X" and only allows the points along the edges to be determined to ⅛ pixel accuracy. Moreover, the polygon is filled by determining the nearest pixel center to each edge and then filling all points in between. As noted above, this approach can result in undesirable polygon overlap and/or a "peek-through" effect wherein gaps are left around the edges of the polygon. Thus, although Akeley, et al. can quickly calculate the edges, their system still has the overlap and underlap problems referred to above.

Accordingly, an improved polygon rendering technique is desired wherein processing speed and accuracy may be enhanced while polygon overlap and undesired "peek-through" effects may be eliminated. The present invention has been designed for this purpose.

SUMMARY OF THE INVENTION

The above-mentioned problems of the prior art are resolved in accordance with the present invention by providing a polygon rendering circuit which employs a very precise point-sampling algorithm to determine which pixels inside a polygon will be rendered. In particular, the edge intersections with the scan lines are determined to sub-pixel resolution and only those pixels whose centers lie within the true polygon edges are drawn. Such a technique results in fewer artifacts where adjacent polygons have pixels "poking" into one another, fewer "peek-throughs" where pixels from back-facing polygons can be seen through gaps between adjacent polygons, and fewer artifacts while performing polygon anti-aliasing.

This is primarily accomplished in accordance with the present invention by providing a polygon edge stepping circuit which determines the fill area of the polygon by calculating the starting and ending X values of each integer Y scan line of the polygon from the Y start, X start and X slope values for each edge of one or more trapezoids comprising the polygon. The polygon edge stepper of the invention steps along each edge in the direction Y one pixel at a time and adds the X slope value to the X start value of each edge to determine the corresponding X value of the edge. Only those edges which are new to a given trapezoid are sent so as to simplify processing and to eliminate "peek-throughs". The interior of the polygon is defined as only those pixels which are between X start and X end so determined for each scan line. Since adjacent polygons compute the same edge by stepping in accordance with the technique of the invention, there will be no gaps between adjacent polygons. The same technique can be used in accordance with the invention for calculating the starting and ending Z values of each integer Y scan line of the polygon from Y start, Z start and Z slope values for each edge of one or more trapezoids comprising the polygon.

In particular, the present invention relates to a polygon rendering circuit for determining the coordinates of points along respective edges of a polygon on each scan line covered by the polygon and then filling display pixels of the polygon for display. Preferably, such a circuit in accordance with the invention is incorporated into a computer system and comprises means for providing the coordinates (x,y,z) of respective vertices of the polygon representing endpoints of edges of the polygon and the slopes M of lines connecting the respective vertices of the polygon to form the edges. These values are provided to a polygon edge stepper which determines the coordinates (x,y,z) of the intersection of each of the edges with each scan line covered by the polygon. Preferably, the polygon edge stepper starts from an end of the polygon at a first scan line and (1) determines the coordinates (x,y,z) of points on respective edges of the polygon which are in an adjacent scan line by incrementing the coordinate (y) perpendicular to the scan line by a value corresponding to one scan line. The edge stepper then (2) determines the coordinate (x) parallel to the scan line on each edge by adding the slope M for the corresponding edge to the x coordinate for the point of that edge on the previous scan line, and (3) repeats determinations (1) and (2) for each scan line intersecting the respective edges until the coordinates (x,y) of points on the edges for the scan line at an end of at least one edge have been determined. Steps (1)–(3) are similarly performed for determining the z coordinate until the coordinates (x,y,z) of points on the edges for the scan line at an end of at least one edge have been determined. The edge stepper then (4) repeats determinations (1) through (3) for subsequent edges of the polygon, starting from the scan line after the scan line at the end of the at least one edge, until the coordinates (x,y,z) of all the intersections with the scan lines along each edge of the polygon have been determined. Interpolating means are also provided for determining which display pixels are on an inside portion of the polygon with respect to the determined coordinates (x,y,z) of all edges of the polygon. Only those display pixels which are on the inside portion of the polygon are then filled for display.

In a preferred embodiment of the invention, the polygon edge stepper comprises a double buffer which is responsive to inputs from the providing means and which stores the coordinates (x,y,z) of the intersections, the slopes M and a y count value setting forth the number of scan lines in the polygon. The polygon edge stepper may further comprise a controller responsive to the y count value and a command from the providing means for controlling transfer of data between respective registers of the double buffer and for controlling output of data to the interpolating means. The polygon edge stepper may further comprise an adder for adding the slope M of each edge to the corresponding coordinate for the point of that edge on the previous scan line.

Thus, in accordance with the invention, the polygon edge stepper determines the z coordinate for the intersection of each of the edges with each scan line covered by the polygon using in place of the slopes M the slopes Z determined with respect to the y coordinate axis. Preferably, the z coordinate and x coordinate of the intersections are determined in parallel so as to minimize processing time. Preferably, both the x and z coordinates of the intersections are determined to sub-pixel resolution using the technique of the invention.

The scope of the invention also includes a method of determining the coordinates of points along respective edges of a polygon on each scan line covered by the polygon and then filling display pixels of the polygon for display. Preferably, such a method in accordance with the invention comprises the steps of:

(a) providing the coordinates (x,y,z) of respective vertices of the polygon representing endpoints of edges of the polygon and the slopes M of lines connecting the respective vertices of the polygon to form the edges;

(b) starting from an end of the polygon at a first scan line, determining the coordinates (x,y,z) of points on respective edges of the polygon which are in an adjacent scan line by incrementing the coordinate (y) perpendicular to the scan line by a value corresponding to one scan line and determining the coordinate (x) parallel to the scan line on each edge by adding the slope M for the corresponding edge to the x coordinate for the point of that edge on the previous scan line;

(c) repeating step (b) for each scan line intersecting the respective edges until the coordinates (x,y,z) of points on the edges for the scan line at an end of at least one edge have been determined;

(d) if all vertices of the polygon have not been provided, providing the coordinates (x,y,z) of a first vertex of a new edge sharing a second vertex with the end of the at least one edge and the slope M of a line connecting the first and second vertices of the new edge;

(e) starting from the scan line after the scan line at the end of the at least one edge, repeating steps (b) through (d) for subsequent edges of the polygon until the coordinates (x,y,z) of all intersections with the scan line along each edge of the polygon have been determined;

(f) determining which display pixels are on an inside portion of the polygon with respect to the determined coordinates (x,y,z) of all edges of the polygon; and (g) filling for display only those display pixels which are on the inside portion of the polygon.

Of course, the same steps may be used for determining the z coordinates and appropriately filling the polygon.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings of which.

DETAILED DESCRIPTION OF THE PREFERRED EMBODIMENT

The inventor of the subject matter disclosed and claimed herein has satisfied the above-mentioned needs in the art by developing a polygon rendering circuit which steps along the edges of input polygons to define the edges of the polygons to sub-pixel resolution so that spans of pixels within each polygon may be more accurately defined and rendered without excess processing and undesired polygon overlap or underlap. A process and apparatus with these and other beneficial features in accordance with a presently preferred exemplary embodiment of the invention will now be described with reference to FIGS. 3-6. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Figure 1:
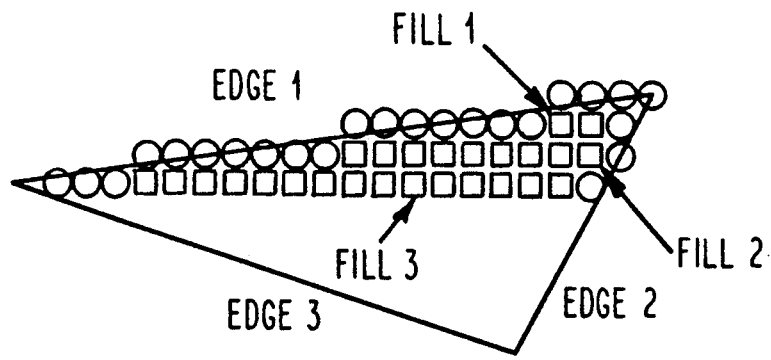
FIG. 1 illustrates a polygon filled in accordance with the extended Bresenham algorithm described by the present inventor in an article entitled "A Fast Shaded-Polygon Renderer".
Figure 2:
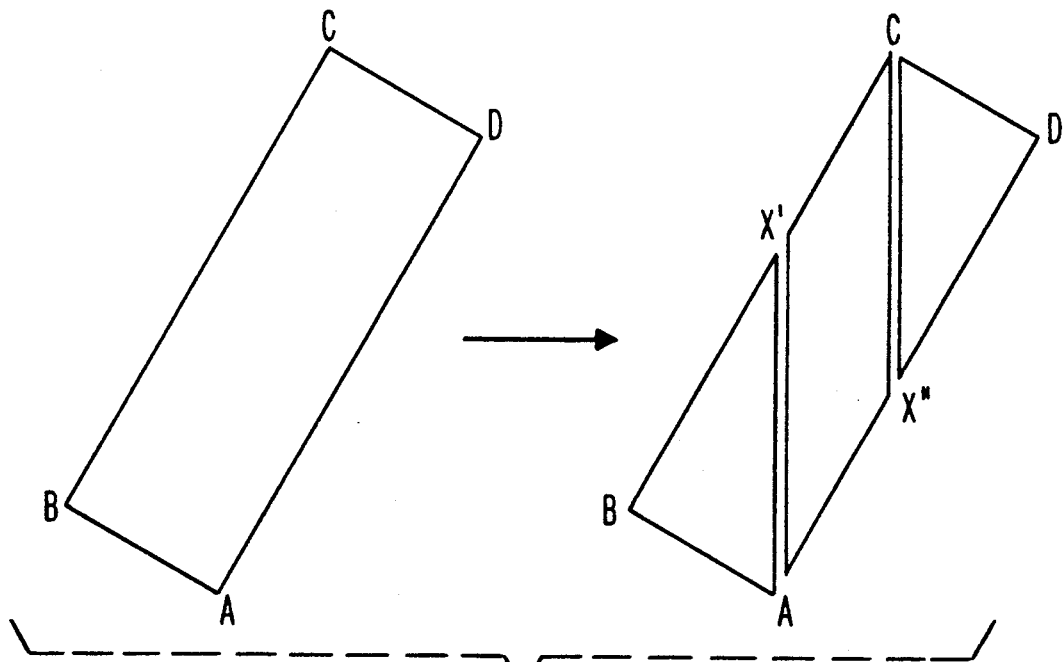
FIG. 2 illustrates polygon decomposition in accordance with the techniques taught by Akeley et al. in an article entitled "High-Performance Polygon Rendering".
Figure 3:
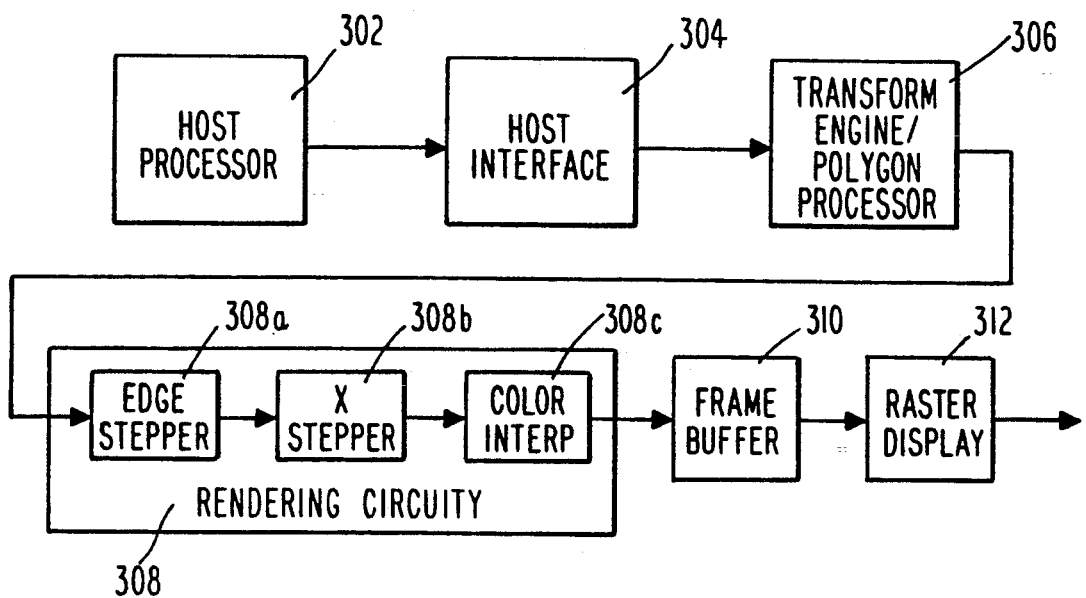
FIG. 3 schematically represents a conceptual block diagram of a host system and a graphics processing subsystem including rendering circuitry embodying the present invention.

FIG. 3 shows a host processing system 302 interfaced with a graphics subsystem via a host interface 304. As shown, the graphics subsystem generally comprises a graphics transform engine/polygon processor 306 with its output provided to graphics rendering circuitry 308. The output of graphics rendering circuitry 308 is applied to frame buffer 310, the output of which is received by a raster display device 312 for output to a CRT screen, for example. As will be described in detail below, the present invention is particularly directed to the rendering circuitry 308 and the technique by which polygons are filled for storage in the frame buffer and subsequent display on the display device.

As known to those skilled in the art, the transform engine/polygon processor 306 functions to convert the input vertices to screen coordinates representative of input polygons. A preferred embodiment of a transform engine/polygon processor 306 in accordance with the invention further decomposes the input polygons into trapezoids with one or two edges parallel to the coordinate direction of the display screen. Techniques for subdividing the input polygons in this manner are described in the aforementioned related U.S. patent Ser. Nos. 07/493,185 (now U.S. Pat. No. 5,133,049) and 07/494,292 (now U.S. Pat. No. 5,129,051), which have been incorporated by reference. The rendering circuitry 308 of the present invention is preferably placed so as to receive trapezoids output by such polygon processors as input. Typically, the trapezoids are defined as data including the following: a Y start value indicating the starting trapezoid Y value, a Y count value indicating the number of scan lines in the polygon, an X start value for edge A indicating the starting X coordinate value of trapezoid edge A, a Y slope value for edge A indicating the rate of change of X in edge A for each step in Y, a Z start value for edge A indicating the starting Z coordinate value of trapezoid edge A, a Z slope value for edge A indicating the rate of change of Z in edge A for each step in Y, an X start value for edge B indicating the starting X coordinate value of trapezoid edge B, a Y slope value for edge B indicating the rate of change of X in edge B for each step in Y, a Z start value for edge B indicating the starting Z coordinate value of trapezoid edge B, and a Z slope value for edge B indicating the rate of change of Z in edge B for each step in Y. Also, in accordance with the invention such data may include Z slope fractional values indicating the fractional Z slope values for edges A and B. Also, if such capability is provided by the system, the input data may include perspective data W which is treated in the same manner as the X, Y and Z values in accordance with the invention.

The rendering circuitry 308 of the invention receives the trapezoid data from the polygon processor 306 and uses it to determine the start and end pixels of the various spans (rows of pixels) which comprise the input trapezoids. Each trapezoid is defined as having exactly two non-horizontal edges so that the trapezoid can be defined simply by indicating the Y starting value and height, along with edge descriptions. In other words, the Y values, the starting X and Z values and the span lengths completely define each input trapezoid to be drawn. As will be described below, a Draw Trapezoid command passed through the transform engine/polygon processor 306 tells the rendering circuitry 308 to draw a trapezoid defined by such data.

As shown in FIG. 3, the rendering circuitry 308 preferably comprises edge stepper 308a, X stepper 308b and color interpolation circuitry 308c. As will be described in more detail below, Draw Trapezoid commands are interpreted by edge stepper 308a and trapezoids and vectors are rendered as described. Other commands are sent down the graphics pipeline to the remaining blocks of the rendering circuitry 308 or to other downstream systems. Generally, when a trapezoid or vector is to be drawn, the edge stepper 308a steps down the raster scan lines in Y coordinate steps and computes the XZ coordinate intersections of the edges with each scan line. The slope of each edge, which is provided as the aforementioned Y slope and Z slope values, is provided by upstream hardware and is repeatedly added to the X and Z intersections of the previous scan line to determine the current X and Z intersections. If such capability is provided, perspective correction factors (W values) are similarly computed along each edge. The edge stepper 308a thus generates span limits for each scan line in the trapezoid where a span limit consists of a Y value (the scan line) and the X, Z and W intersections of each edge with the scan line. A preferred embodiment of edge stepper 308a will be described in more detail below with respect to FIG. 5.

The calculated span extents are then passed to the X stepper block 308b. The X stepper 308b traverses each trapezoid span extent, generating the pixel X coordinates along the spans and setting mode bits that drive the color interpolator block 308c. If desired, vectors may be anti-aliased via a transparency filter (not shown) which is stored in a color-lookup table ROM in the X stepper. Such a color lookup table may be indexed by the slope of the line in the intersection of each step of the line with the minor axis.

Colors and transparency factors, if used, are produced in the color interpolator 308c along the trapezoid edges by first computing for each span endpoint its fractional distance in XY space between the vertices defining the trapezoid edge. After the fractional distance in screen space is known, it is multiplied by the difference in color of the two vertices and added to the starting vertex color. A separate multiplication is done for each color and transparency component. If both specular and diffuse/ambient colors are being computed independently, then two sets of multiplications must be done for each color component. The color of pixels along each trapezoid span or vector is then computed by repeating the algorithm using the span endpoint color and XY values. Perspective correction may be applied during both the edge and span color interpolations as described in the aforementioned related U.S. patent application Ser. No. 07/493,189. Then, once the pixel parameters have been computed by the color interpolator 308c, the pixel parameters are written into the frame buffer 310. The pixel values stored in the frame buffer 310 are then output to the raster display 312 for display in accordance with known techniques. The Z values are separately processed and output to a Z buffer for comparison with previously stored Z values in accordance with techniques also known to those skilled in the art.

Figure 4:
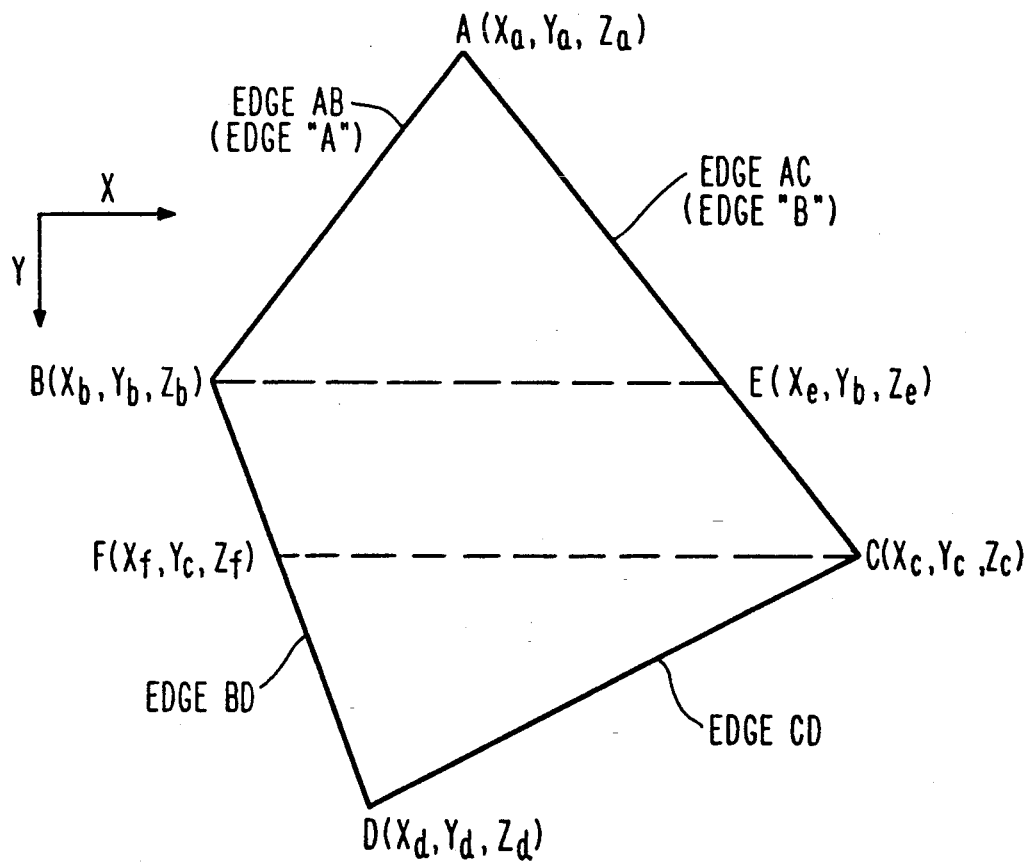
FIG. 4 illustrates an input polygon which is divided into trapezoids before rendering in accordance with the techniques of the present invention.

FIG. 4 illustrates a sample input polygon defined by vertices A, B, C and D. As shown in FIG. 4, polygon ABCD is preferably subdivided into a triangle with vertices A, B and E, a trapezoid with vertices B, E, C and F, and another triangle with vertices C, D and F. The edge stepper 308a of the invention starts at one end (A or D) of the polygon and the adjacent edges are read in as the aforementioned edges A and B. For example, if edge stepping is to start at vertex A, the slopes of segments AB (Edge A) and AC (Edge B) are read in. The X, Y and Z values for vertex A are recorded and then edge stepping proceeds in parallel along edges AB and AC. Namely, the next point on edge AB is calculated by incrementing the Y value by one scan line and adding the slope of the edge AB to the X value of vertex A. The intersection of edge AC with that scan line is similarly calculated. Such edge stepping proceeds by incrementing Y by 1 for each line and calculating the intersection of the edge with the scan line (the X coordinate) until vertex B is reached. At this point, the coordinates of vertex D and the slope of new edge BD is read in as Edge A. Since only one edge needs to be updated at this time, only one new edge (Edge A) is sent to the edge stepper 308a. The other edge (edge AC) continues where it left off. As will be appreciated by one skilled in the art, by reading in only one edge, the required input bandwidth may be reduced and polygon processing performance enhanced. Edge stepping then proceeds along edges BD and AC until vertex C is reached, at which time edge AC is replaced by edge CD as Edge B. Such an edge stepping process continues until vertex D is reached and hence the intersections of all edges with the scan lines have been defined.

Figure 5:
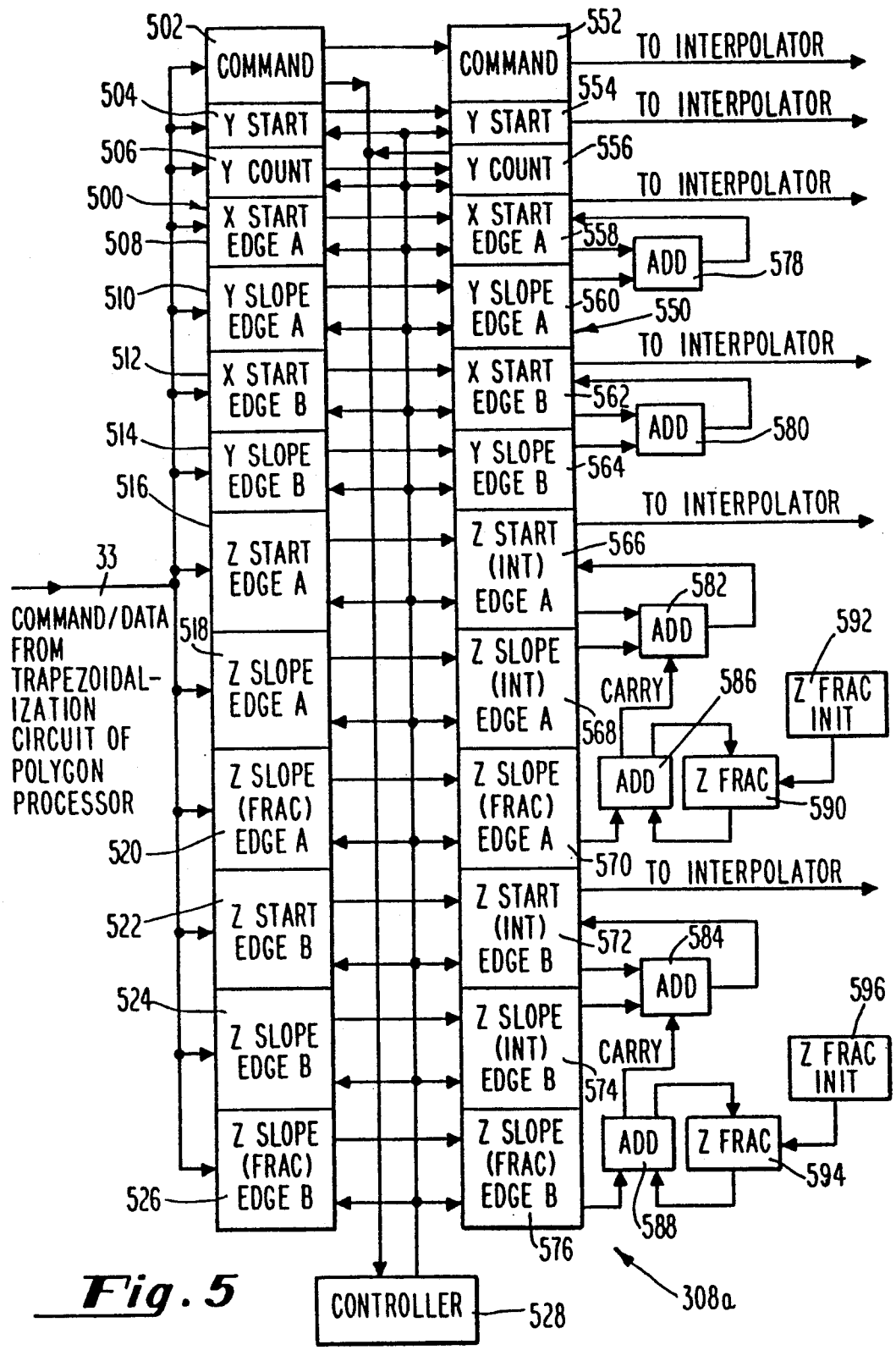
FIG. 5 schematically illustrates a preferred embodiment of an edge stepper incorporating the invention.

FIG. 5 illustrates a preferred embodiment of an edge stepper 308a in accordance with the invention. As shown, the edge stepper 308a comprises first and second data buffers 500 and 550, respectively. Data buffers 500 and 550 function to double buffer the input data. In other words, the first row of registers on the left side forms an input data buffer 500 so that new data can be loaded in while the previous trapezoid is being processed using the second row of registers on the right side (data buffer 550). As will be appreciated by those skilled in the art, such an arrangement facilitates pipelined processing.

As noted above, a command may be received by the edge stepper 308a in the input data. If the command is not a Draw Trapezoid command, the command is generally ignored and stored in register 552 before being sent downstream. However, if the command is a Draw Trapezoid command, it is stored in register 502 of data buffer 500. The Draw Trapezoid command preferably has a C/D bit which is set to indicate whether the input data is a command or data; therefore, the input data is shown to have 33 bits even though the Draw Trapezoid command in a preferred embodiment has only 32 bits. Data of the type described above which is associated with this Draw Trapezoid command is then stored in respective registers 504 through 526 as shown. Once all the data is read in, it is transferred by controller 528 to data buffer 550 and stored in the corresponding registers 554 through 576.

As noted above, the value Y start corresponds to the scan line at which the current polygon begins, while the value Y count corresponds to the number of scan lines of the input polygon. In a preferred embodiment, Y count is decremented as each scan line along each edge is traversed. In other words, the Y count value is decremented by controller 528 as each scan line is traversed and is compared to zero to determine whether the last scan line of the current trapezoid has been reached. The updated value is stored in Y count register 556 by controller 528.

Thus, as just described, the first row of registers of data buffer 500 on the left side forms an input buffer so that new data can be loaded in while the previous trapezoid is being processed. Then, when the previous trapezoid is finished, the new data is loaded into the row of registers on the right (data buffer 550), where the actual edge stepping takes place. The first span is defined by the initial X start value for edge A, the X start value for edge B, the Z start value for edge A, and the Z start value for edge B, that is, these values define the two endpoints of the row of pixels. Downstream hardware such as the color interpolator 308c takes these endpoints and converts them into pixels. The second span is then determined by adding the slope values (Y slope or Z slope) to the respective X and Z values at adders 578, 580, 582 and 584, and the value Y count is decremented by one. Once again, the new data values are sent to the color interpolator 308c for conversion into pixels. This process of adding the slopes and creating new spans continues until the value Y count equals zero. At this time, data for the next trapezoid can be transferred into data buffer 500.

The above edge stepping process is implemented in the circuit of FIG. 5 by adding at adder 578 the X coordinate value stored in register 558 for the intersection of edge A with the previous line to the Y slope value for edge A. The updated value is stored in register 558 and then output to the color interpolator 308c. The updated value for edge B is determined at adder 580 in a similar manner. A similar process is performed using adders 582 and 584 for determining the updated Z value along edges A and B. However, in accordance with the preferred embodiment, adders 586 and 588 are also provided for giving added precision to the calculation of the current Z value. More particularly, the Z slope value for each edge is represented as 32 bits of integer data and 16 bits of fractional data. Preferably, the fractional Z slope data for edges A and B can be sent together in the same 32 bit data word. The fractional Z slope data for edge A is then stored in registers 520 and 570, while the fractional Z slope data for edge B is stored in registers 526 and 576. During processing, the fractional Z slope value in register 570 is added to a fractional Z component stored in register 590 for determining the updated fractional Z value. In particular, an initial Z fractional value such as ½ is stored in register 592, and this value is added to the output of adder 586 to form the updated fractional Z value in register 590. This value is, in turn, added to the current fractional Z slope value in adder 586. Any carry out value is added to the sum of the integer Z slope value and the Z value for the previous line on edge A in adder 582. In this manner, the registers 566, 568 and 570 and elements 582, 586, 590 and 592 together function to provide 48 bit accuracy for the Z slope value which is output to the interpolator. Similar processing is performed for the fractional Z slope values for edge B using adders 584 and 588 and registers 594 and 596.

Although such extra precision in the Z direction is presently preferred, such precision is certainly not necessary and is optional at the discretion of one skilled in the art. As noted above, the determined Z value is next interpolated in the polygon and compared to a value already in the Z buffer in downstream Z buffer hardware.

As noted above, a Draw Trapezoid command from the transform engine/polygon processor 306 instructs the rendering circuitry 308 to draw a new trapezoid with a specified set of vertices. Mode bits are preferably provided in the Draw Trapezoid command to specify what type of trapezoid is to be drawn. This technique allows bandwidth into the rendering circuit 308 to be minimized while also preventing the aforementioned overlap and underlap effects. In particular, the mode bits are used to take advantage of the fact that two consecutively rendered trapezoids will often share an edge. Since it is inefficient to retransmit the slope information for this common edge when the second trapezoid is to be displayed, the mode bits identify trapezoids which share a side edge with a previous trapezoid. Controller 528 updates one or both edges stored in buffers 500 and 550 in accordance with the mode value. The following mode bits are possible in a preferred embodiment:

00—Both edges are shared, so send new Y count and Y start values only;
01—The A edge is shared, so a new B edge will be sent;
10—The B edge is shared, so a new A edge will be sent; and
11—Neither edge is shared, so send both edges (a new trapezoid).

The precise data word sequence following the Draw Trapezoid command is determined by the mode bits and a flag indicating whether or not perspective scale value W and slope information associated with W is to be received. The mode field thus reduces the amount of data that must be sent to the rendering circuitry 308. Also, as previously mentioned, reusing the edge information reduces the chances of round-off errors causing inter-trapezoid gaps.

The color interpolation performed by color interpolator 308c preferably accounts for perspective foreshortening as described in the aforementioned related U.S. patent application Ser. No. 07/493,189. As described therein, the colors at the intersections of the edges with the scan line containing a particular pixel P whose value is to be determined are calculated. These values are generated by finding the fractional distance along the edge of each intersection (after applying perspective correction to account for the foreshortening introduced by projecting the original 3-D polygon onto the 2-D screen space polygon), multiplying this fraction by the change in difference in color between the two vertices defining the corresponding edge and adding that color delta to the top vertex color. Once the colors at the ends of the span containing the pixel P have been found, the same process is repeated for each pixel along the span including pixel P. The amount of calculation for such color interpolation can be reduced by noting that a fractional distance for each edge and along the span for each pixel may be computed independent of the color components. The final pixel color may then be determined by multiplying this value by each color delta and adding it to the offset. However, if full perspective correction is desired, one divide per pixel and one multiply per color component is necessary. The edge intersections each require additional calculations.

Figure 6:
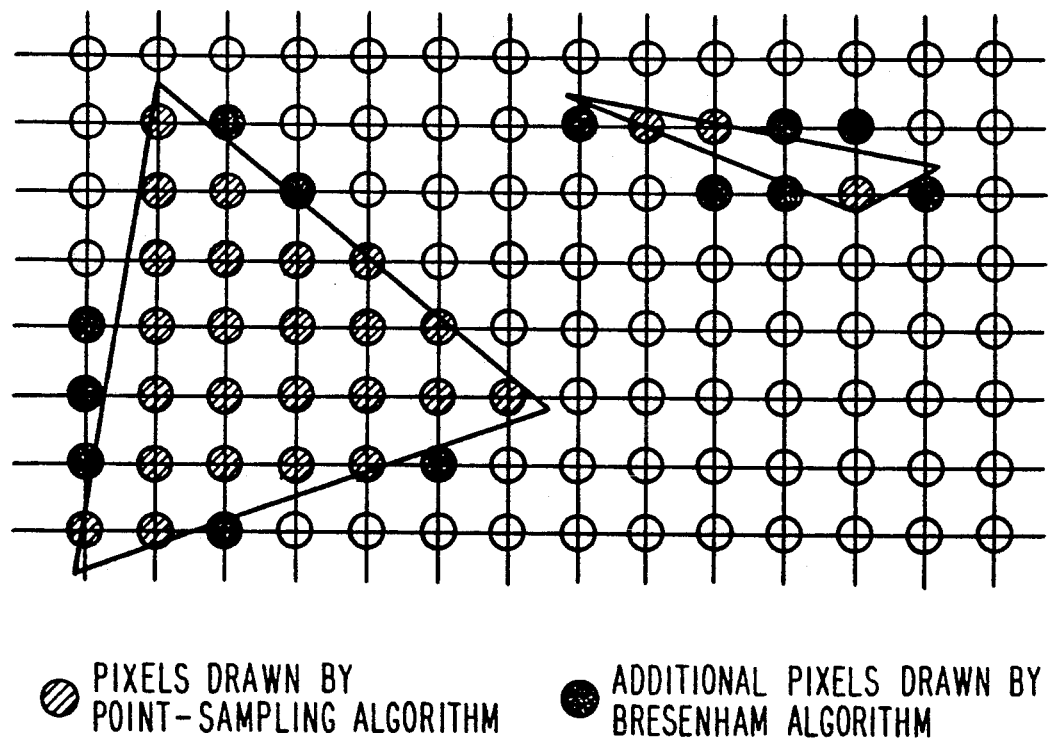
FIG. 6 illustrates a comparison of two polygons and the pixels which will be drawn in accordance with the polygon filling technique of the present invention and in accordance with the previously described extended Bresenham algorithm.

FIG. 6 illustrates a comparison of the polygon rendering technique of the invention with a technique using the extended Bresenham algorithm. In accordance with the precise point sampling technique of the invention, wherein subpixel resolution is provided by stepping along the edges such that only those pixels whose centers lie within the true polygon edges need to be drawn, improved results may be achieved when compared with the extended Bresenham algorithm. As described above and illustrated in FIG. 6, the extended Bresenham algorithm renders polygon edges by drawing the pixels which lie closest to the true polygon edges, irrespective of whether the closest points are inside or outside of the polygon being filled. FIG. 6 shows two polygons and the pixels which will be drawn by each of the two algorithms, where the lightly shaded circles illustrate those pixels which will be drawn in accordance with the technique of the present invention, while the darker shaded circles illustrate the additional points which will be shaded when the extended Bresenham algorithm is used. As is apparent from FIG. 6, the technique of the invention is advantageous in that fewer artifacts where adjacent polygons have pixels "poking" into one another, fewer "peek-throughs" where pixels from back-facing polygons can be seen through gaps between adjacent polygons, and fewer artifacts while performing polygon anti-aliasing result.

In sum, the polygon rendering circuit of the invention thus determines the fill area of a polygon by calculating the X values (start and end) of each integer Y scan line of the polygon from the Y start, X start and X slope values for each edge of one or more trapezoids comprising the polygon. The edge stepper steps in Y one pixel and adds the X slope values to the X start values of each edge. Only those edges which are new to a given trapezoid are sent so as to minimize bandwidth requirements and to eliminate gaps between polygons. The Z values are computed the same as, and in parallel with, the X values. The interior of the polygon is then defined as those pixels between the X start and X end values on each scan line, and the polygon is filled by only drawing those pixels whose centers lie within the true polygon edges.

The present invention thus provides sub-pixel precision for calculating the edges and renders polygons which are much more accurate than heretofore possible. Moreover, the present invention makes it easier to break the polygon processing up for processing in parallel processors whereby different spans may be processed by different processors. These and other advantages are made possible in accordance with the present invention, as will become readily apparent to those skilled in the art.

Although a single exemplary embodiment of the invention has been described in detail above, those skilled in the art will readily appreciate that many additional modifications are possible in the exemplary embodiment without materially departing from the novel teachings and advantages of the invention. For example, the stepping technique of the invention may be incorporated into a Z interpolator and may also be used to calculate $\alpha$ transparency values, interpolated perspective W values and the like. Also, one skilled in the art will realize that the technique of the invention may be used for systems in which the scan direction is parallel to the Y axis instead of the X axis. Furthermore, one skilled in the art will readily appreciate that rather than performing successive additions along each edge that a single multiply per span of the slope times the difference in Y added to the starting X value will yield the same result. Accordingly, all such modifications are intended to be included within the scope of this invention as defined in the following claims.

I claim:

1. A polygon rendering circuit for rendering a plurality of polygons representing an image to a raster display device, each polygon having respective edges intersecting at least one scan line of said raster display device, comprising:

means for providing coordinates (x,y,z) of respective vertices of said polygon, said vertices representing endpoints of edges of said polygon, and for providing slopes $M_x$ and $M_z$ with respect to a y coordinate of lines connecting the respective vertices of said polygon to form said edges;

a polygon edge stepper for determining coordinates (x,y,z) of an intersection of each of said edges with each scan line of said polygon, said polygon edge stepper starting at a first scan line of said polygon, and (1) determining coordinates (x,y,z) of points along respective edges of said polygon which are in an adjacent scan line by incrementing a coordinate (y) perpendicular to said scan line to a y coordinate of said adjacent scan line, (2) determining a coordinate (x) parallel to said scan line and a coordinate (z) perpendicular to x and y axes for each edge of said polygon intersecting said scan line by adding the slope $M_x$ for the corresponding edge to an x coordinate for that edge on the previous scan line and adding the slope $M_z$ for the corresponding edge to a z coordinate for that edge on the previous scan line, (3) repeating determinations (1) and (2) for each scan line intersecting said respective edges until the coordinates (x,y,z) of said edges for a scan line at an end of at least one edge have been determined, and (4) repeating determinations (1) through (3) for subsequent edges of said polygon, starting from a scan line after the scan line at the end of said at least one edge, until the coordinates (x,y,z) of all said intersections along each edge of said polygon have been determined;

interpolating means for determining which display pixels of said raster display device are on an inside portion of said polygon with respect to the determined coordinates (x,y,z) of all edges of said polygon and appropriately shading for display only those display pixels which are on said inside portion of said polygon; and a buffer for temporarily storing said shaded display pixels and then sending said shaded display pixels to said raster display device for display.

2. A circuit as in claim 1, wherein said polygon edge stepper comprises a double buffer, responsive to said providing means, for storing the coordinates (x,y,z) of said intersections, said slopes $M_x$ and $M_z$ and a y count value setting forth the number of scan lines in said polygon.

3. A circuit as in claim 2, wherein said polygon edge stepper further comprises a controller responsive to said y count value and a command from said providing means for controlling transfer of data between respective registers of said double buffer and for controlling output of data to said interpolating means.

4. A circuit as in claim 3, wherein said polygon edge stepper further comprises an adder for adding the slope $M_x$ of each edge to the x coordinate for the point of that edge on the previous scan line and an adder for adding the slope $M_z$ of each edge to the z coordinate for the point of that edge on the previous scan line.

5. A circuit as in claim 1, wherein said polygon edge stepper determines the z coordinate and x coordinate of said intersections in parallel.

6. A circuit as in claim 1, wherein said coordinates (x,y,z) of said intersections are determined to sub-pixel resolution.

7. A computer graphics system having a polygon rendering circuit for rendering a plurality of polygons representing an image to a raster display device, each polygon having respective edges intersecting at least one scan line of said raster display device of said computer graphics system, comprising:
  means for providing coordinates (x,y,z) of respective vertices of said polygon, said vertices representing endpoints of edges of said polygon, and for providing slopes $M_x$ and $M_z$ with respect to a y coordinate of lines connecting the respective vertices of said polygon to form said edges;
  a polygon edge stepper for determining coordinates (x,y,z) of an intersection of each of said edges with each scan line of said polygon, said polygon edge stepper starting at a first scan line of said polygon, and (1) determining coordinates (x,y,z) of points along respective edges of said polygon which are in an adjacent scan line by incrementing a coordinate (y) perpendicular to said scan line to a y coordinate of said adjacent scan line, (2) determining a coordinate (x) parallel to said scan line and a coordinate (z) perpendicular to x and y axes for each edge of said polygon intersecting said scan line by adding the slope $M_x$ for the corresponding edge to an x coordinate for that edge on the previous scan line and adding the slope $M_z$ for the corresponding edge to a z coordinate for that edge on the previous scan line, (3) repeating determinations (1) and (2) for each scan line intersecting said respective edges until the coordinates (x,y,z) of said edges for a scan line at an end of at least one edge have been determined, and (4) repeating determinations (1) through (3) for subsequent edges of said polygon, starting from a scan line after the scan line at the end of said at least one edge, until the coordinates (x,y,z) of all said intersections along each edge of said polygon have been determined;
  interpolating means for determining which display pixels of said raster display device are on an inside portion of said polygon with respect to the determined coordinates (x,y,z) of all edges of said polygon and appropriately shading for display only those display pixels which are on said inside portion of said polygon; and
  a buffer for temporarily storing said shaded display pixels and then sending said shaded display pixels to said raster display device for display.

8. A method of rendering a plurality of polygons representing an image to a raster display device, each polygon having respectively edges intersecting at least one scan line of said raster display device, comprising the steps of:
  (a) providing coordinates (x,y,z) of respective vertices of said polygon, said vertices representing endpoints of edges of said polygon, and providing slopes $M_x$ and $M_z$ with respect to a y coordinate of lines connecting the respective vertices of said polygon to form said edges;
  (b) starting at a first scan line of said polygon, determining coordinates (x,y,z) of points along respective edges of said polygon which are in an adjacent scan line by incrementing a coordinate (y) perpendicular to said scan line to a y coordinate of said adjacent scan line and determining a coordinate (x) parallel to said scan line and a coordinate (z) perpendicular to x and y axes for each edge of said polygon intersecting said scan line by adding the slope $M_x$ for the corresponding edge to an x coordinate for that edge on the previous scan line and adding the slope $M_z$ for the corresponding edge to a z coordinate for that edge on the previous scan line;
  (c) repeating step (b) for each scan line intersecting said respective edges until the coordinates (x,y,z) of said edges for a scan line at an end of at least one edge have been determined;
  (d) if all vertices of said polygon have not been provided, providing the coordinates (x,y,z) of a first vertex of a new edge sharing a second vertex with said end of said at least one edge and the slopes $M_x$ and $M_z$ of a line connecting the first and second vertices of said new edge;
  (e) starting from a scan line after the scan line at the end of said at least one edge, repeating steps (b) through (d) for subsequent edges of said polygon until the coordinates (x,y,z) of all intersections with the scan line along each edge of said polygon have been determined;
  (f) determining which display pixels of said raster display device are on an inside portion of said polygon with respect to the determined coordinates (x,y,z) of all edges of said polygon; and
  (g) shading for display only those display pixels which are on said inside portion of said polygon; and
  (h) sending said shaded display pixels to said raster display device for display.

9. A method as in claim 8, wherein a y count value setting forth the number of scan lines in said polygon is further provided in said providing step and said step (e) is completed when the edge coordinates for the number of scan lines specified by said y count values have been determined.

10. A method as in claim 8, wherein said coordinates (x,y,z) of said intersections are determined in steps (b) through (e) to sub-pixel resolution.

* * * * *